Sept. 30, 1941.   D. TENNEY   2,257,487
BREAD COOLER
Filed Aug. 19, 1937   2 Sheets-Sheet 2
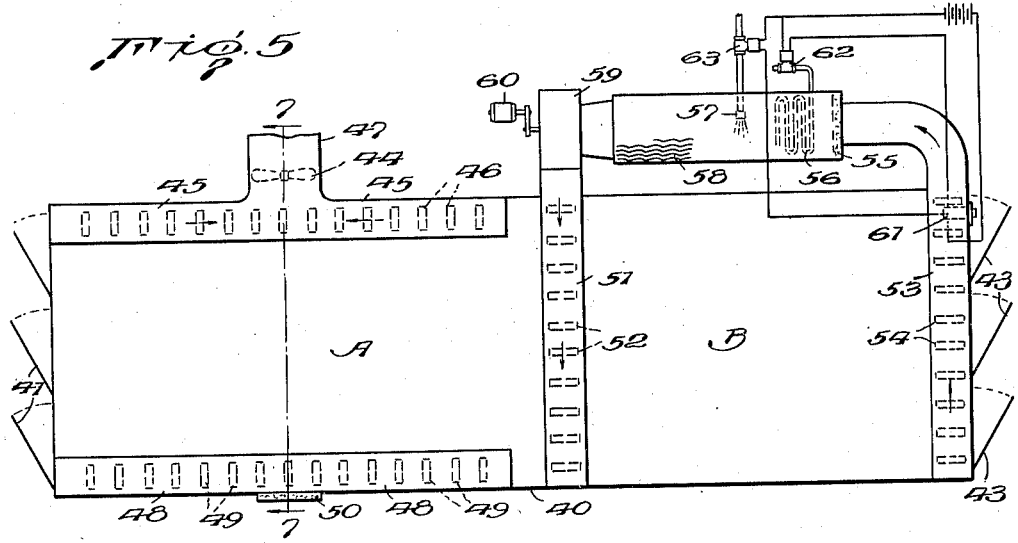
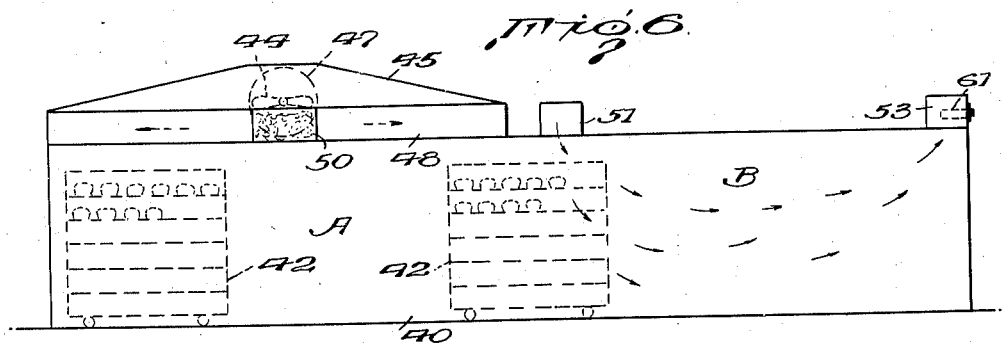
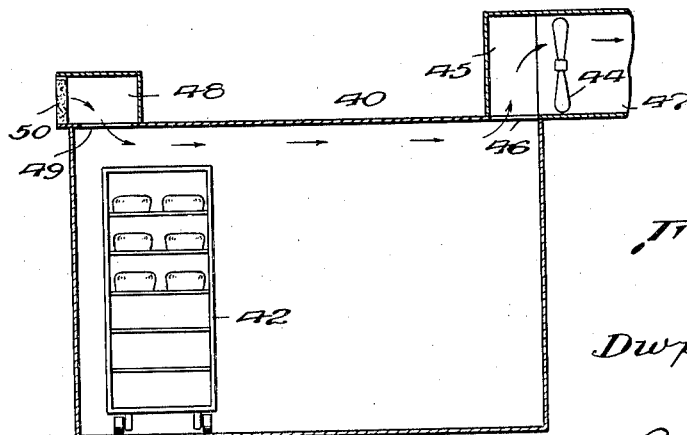
Inventor
Dwight Tenney,
By Ralph B. Stewart
Attorney Patented Sept. 30, 1941

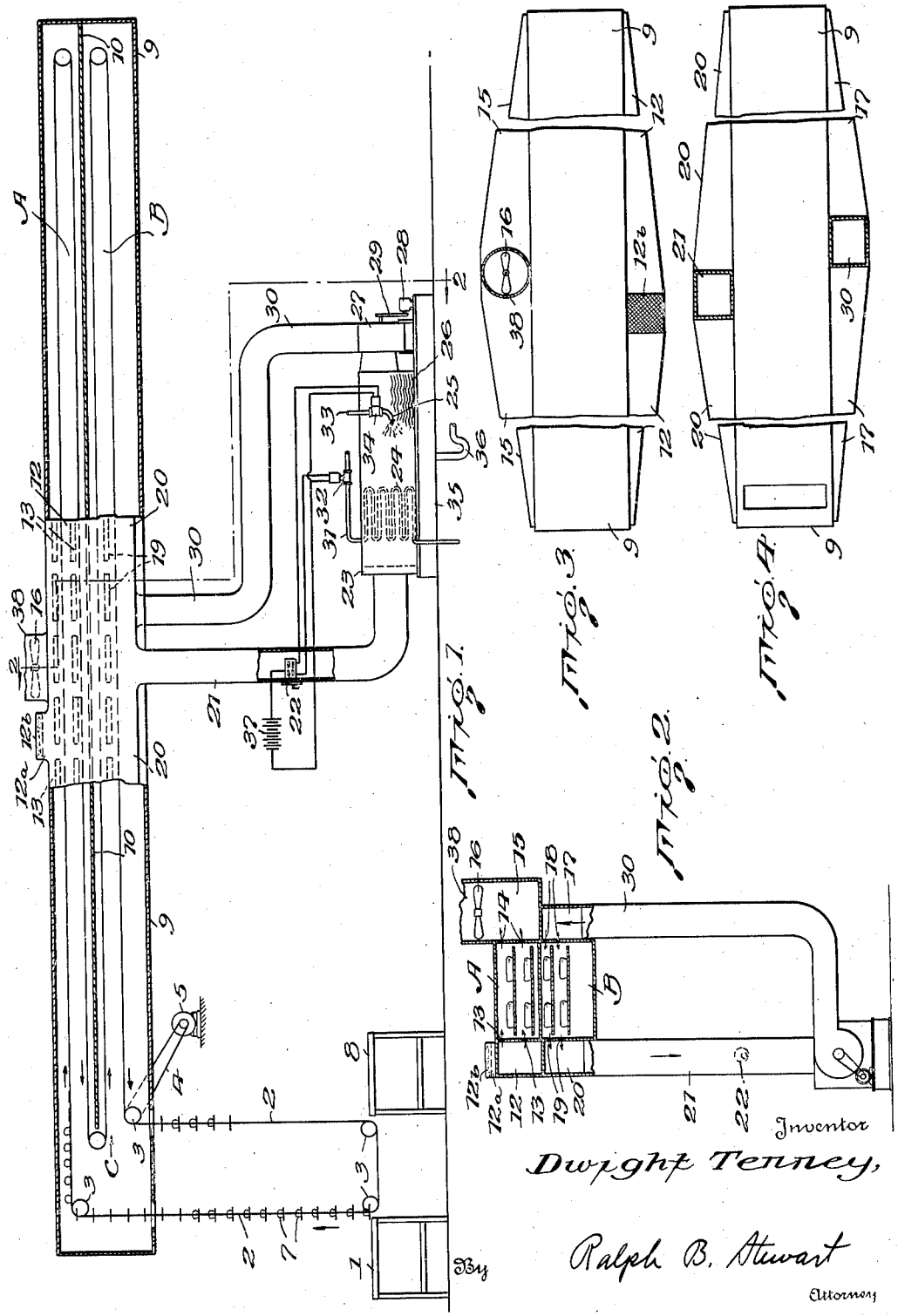

2,257,487

UNITED STATES PATENT OFFICE 2,257,487

BREAD COOLER

Dwight Tenney, Verona, N. J.

Application August 19, 1937, Serial No. 159,979

6 Claims. (Cl. 34—50)

This invention relates to bread coolers and in particular to coolers of the type in which the condition of the cooling air is controlled to secure the desired condition of the bread and crust as the bread leaves the cooler.

My invention may be applied to two different systems of bread cooling now in common use, that is, it may be applied to the overhead traveling conveyor type of cooler or to the tunnel type of cooler in which the bread is loaded upon trucks or other conveyors and passed through a cooling housing in the form of a tunnel.

In the past, attempts have been made to enclose the bread cooling conveyor and to condition it in its entirety. This method has proved impractical in general baking practice because of the very large amount of refrigeration required to remove heat from the bread at oven temperature down to the temperature at which the bread is in a proper condition for wrapping. One object of the present invention is to devise a bread cooling system which requires less refrigeration and is economical in operation.

In the cooling of bread, it is very important that the condition of the crust be carefully controlled because if the air is too dry, it will evaporate an excessive amount of moisture from the bread and make it hard, or if it is too moist, it will prevent moisture from evaporating, thus making the bread soft and soggy and a fertile field for mold contamination. A further object of this invention is to devise a cooling system for maintaining the proper moisture condition in the cooling atmosphere to obtain the desired physical condition of the bread as it leaves the cooler. Specifically, I seek to maintain a substantially constant moisture content of the cooling air in the delivery end of the cooler.

Another feature of the present invention is in the use of a humidostat having a moisture responsive element formed of organic material. I have discovered that better crust conditions are obtained by the use of a humidostat of this type.

When bread leaves an ordinary bake oven, the inside temperature of the crumb is approximately the temperature of boiling water and by the time it enters the cooler, it will be approximately 195 degrees. Because the rate of cooling of all substances is substantially proportional to the mean temperature differential of the cooling substance and the surrounding atmosphere, it is apparent that the bread will cool very rapidly during the early stages of its cooling process. Also, because of the fact that the vapor pressure of the moisture inside the loaf is greatest when the loaf is hot, most of the excess moisture will also be lost during the early part of the cooling, and it is easy to see that the condition of the surrounding atmosphere both in respect to temperature and humidity has very little effect whatever upon the cooling or dehydrating of hot bread because any normal change in temperature or humidity of the atmosphere is very small in relation to the temperature and vapor pressure in the loaf itself.

However, after the bread has passed approximately one-half of its journey through the cooler, its temperature will be greatly reduced, possibly getting as low as 110 degrees. At this reduced temperature, and consequently reduced vapor pressure, the bread becomes very susceptible to outside atmospheric conditions during the latter half of its cooling. I have found in practice that a temperature of 80° F. and 50% relative humidity makes an ideal condition for cooling bread in the latter stage of the bread cooling process. As has been stated before, if the air varies greatly from this condition of effective humidity, it is detrimental to the condition of the finished product.

According to my invention, the cooling housing is divided into two zones. In the first zone in which the bread is introduced directly from the oven, the bread is cooled principally by radiation and convection, and no attempt is made to cool the bread by conditioned air. A current of untreated air is caused to flow across the top of the bread in the first zone for the purpose of removing the hot gases which rise from the hot bread. In the second zone of the cooler, the bread is subjected to air which is controlled as to its moisture content so that as the bread leaves the cooler, it is surrounded by a cooling atmosphere of substantially constant moisture content. I have found that the direction of the air in either of the two zones of the cooler has very little effect on the cooling process. The air can flow in either a counter flow direction, a concurrent flow direction, or across the bread. It is important that a moderate circulation of air be obtained so that the bread does not pass through any localized dead air pockets.

In the accompanying drawings, I have illustrated two preferred embodiments of my invention as applied both to an overhead traveling conveyor type of cooler and to a tunnel type of cooler.

In the drawings,

Figure 1 is a diagrammatic elevational view, partly in section, showing my invention applied to an overhead traveling conveyor type of cooler;

Figure 2 is a vertical sectional view taken along line 2—2 of Figure 1;

Figure 3 is a plan view of Figure 1 on a reduced scale;

Figure 4 is a bottom view of Figure 1 on a reduced scale;

Figure 5 is a plan view of a tunnel type cooler embodying my invention;

Figure 6 is an elevational view, partly in section, of Figure 5; and

Figure 7 is a vertical sectional view of Figure 5 taken along line 7—7.

Referring to Figure 1, a loading table 1, on which hot bread is deposited as it leaves the oven, is arranged adjacent a dual chain conveyor system 2, that travels over carrier sprockets 3 in a continuous loop. One of the sprockets 3 is driven through a suitable drive 4 by motor 5. Between the two chains at intervals are mounted self-leveling carriers 6 on which the bread 7 is placed as the carriers pass the loading table. It will be seen that bread so placed will travel along a series of passageways and be finally discharged at the unloading table 8 at which time it should be in the proper condition for the slicing and wrapping equipment. Except for the vertical portions of conveyor 2 associated with the loading and unloading tables, the conveyor is usually located at the top of the bakery, and in order to limit the length of the cooler, the conveyor is looped back on itself in four runs as shown in the drawings. Any desired number of runs may be used, and the details of the conveyor per se are not essential to the present invention.

The horizontal or over-head section of conveyor 2 is fully enclosed by housing 9. Through approximately the center this housing is extended a partition 10 which substantially separates the two upper runs of the conveyor from the two lower runs. This partition substantially divides the conveyor into two equal parts, although the exact arrangement of the partition is not critical and conditions might require different proportions of the conveyor be located in the two sections of the housing. For convenience in expaining this invention, the two sections of the housing will be referred to as compartment A and compartment B, compartment A being the first section into which the bread is conveyed directly from the oven, while compartment B is the section through which the cooler bread passes after leaving compartment A.

Along one side of compartment A is arranged an air supply duct 12 which communicates with compartment A by means of a number of perforations or ports 13 formed in the side wall of compartment A. Duct 12 is provided with an inlet port 12a through which room air is drawn, and a filter 12b may be arranged over the inlet 12a, if desired. It will be understood that the duct 12 is not essential and may be omitted, in which case room air would be drawn directly into compartment A through ports 13. Under certain circumstances, the entire left wall of compartment A as shown in Figure 2 may be omitted, so that room air may enter the compartment along the entire side.

The air which is drawn into compartment A through ports 13 flows across the compartment and passes out through the ports 14 formed in the opposite wall of the compartment and enters outlet duct 15 formed along one side of the compartment, and the fan 16 is arranged to suck the air from duct 15 and force it out of exhaust duct 38. As will be seen, the air supplied to compartment A is not controlled as to temperature or humidity, and the purpose of this air is simply to remove the hot gases and vapors which are given off by the bread. By properly adjusting the speed of the conveyor, the bread will have reached a temperature of approximately 110° F. by the time it passes through compartment A and is ready to enter compartment B.

A duct 17 is provided on one side of compartment B, and air, conditioned primarily with regard to humidity, is blown into compartment B from duct 17 through ports 18 formed in the side wall of the compartment. The conditioned air is discharged through ports 19 formed in the opposite wall of compartment B and communicating with duct 20. From duct 20, the air is recirculated through duct 21 containing humidostat 22, through an air filter 23, through cooling coil 24, past the steam humidifying orifice 25, through water eliminators 26, into blower 27 (which is actuated by a motor 28 through driver 29) and from the blower the conditioned air is discharged into duct 30 and conveyed to duct 17, thus making a complete circuit.

I have found that the most satisfactory way of obtaining the ideal condition for bread cooling is to impose in the recirculated air that passes over the bread, a cooling surface or coil 24 which is maintained at the proper dew point by means of ice water or gaseous refrigerant passing through pipe 31 and controlled by valve 32. This coil acts as a dehumidifier when the air contains too much humidity. When the air does not contain enough humidity, I have found it desirable to introduce steam into the air stream by means of orifice 25 supplied with steam from pipe 33 and controlled by cut-off valve 34. This method of controlling humidity is well known to those versed in the art. Because of the fact that bread is a hydroscopic organic material I have found that the best control can be obtained by using a humidostat having a moisture sensitive element formed of a like material such as hair, wooden blocks, silk, etc. Humidostat 22 is placed in suction duct 21 connected to outlet duct 20, and controls valves 32 and 34 to maintain substantially constant humidity of the air leaving compartment B. By this arrangement the best practical results are obtained. If the humidity gets too high, humidostat 22 closes an electric contact which closes valve 34 and opens valve 32 admitting ice water, brine or gaseous refrigerant to pass through cooling coils 24. When these coils are maintained at the proper dew points, moisture will be precipitated and will drip into the tank 35 and be discharged through a tank drain 36. Any of the moisture condensing on coils 24 which is blown off in the form of drops into the air stream is entrained as it passes through static eliminators 26 and drops into tank 35. Thus no entrained moisture is carried into blower 27. Because of the fact that a certain amount of heat is imparted to the air stream as it passes through blower 27 and additional heat is imparted to the air stream while passing through compartment B, I have found in practice that it is unnecessary to install any heater coils in this equipment. Conditions might arise, however, where it would be necessary to install heater coils in the air stream.

If the air passing humidostat 22 has too low a humidity, it causes this humidostat to make contacts which will close valve 32 and open valve 34 admitting steam into the air stream through orifice 33. The static eliminators 26 again function to take out any entrained moisture that might be deposited in the air stream by entrained moisture in the steam line. As shown, valves 32 and 34 are electrically operated by means of suitable magnets or equivalent devices energized from a source of current 37.

Briefly, the operation of the cooler of Figure 1 is as follows: Motor 5 is started and conveyor 2 is set in motion. The hot bread is loaded on the shelves of this conveyor at table 1, and is elevated and started through compartment A. Fan 16 is started and draws the air through compartment A so that the hot gases coming off the bread are exhausted through exhaust duct 38. In this manner compartment A is kept at approximately the same temperature and conditions as the room in which the conveying system is located. The bread will enter this compartment at approximately 195° F. and after it has been conveyed through it to point C in approximately fifty minutes, it will have dropped its temperature to approximately 110° F. and will have lost in moisture approximately 1%. At point C, the bread starts to travel through compartment B in which I have found it desirable to maintain a temperature of 80° F. and 50% relative humidity. This temperature and humidity must not be considered as limiting. The bread travels through compartment B and will leave at point D. As these compartments are shown as approximately the same length, the bread will remain in compartment B approximately the same length of time as it remained in compartment A. It must be noted, however, that this ratio is not limiting, and it may be found desirable to have the two compartments of different lengths. In the fifty minutes in which the bread remains in compartment B, its temperature will have dropped to 90° F. or under, and it will gain or lose practically no moisture. The bread leaving the cooler will be found in ideal condition for slicing and wrapping.

In Figures 5 to 7, I have shown my invention applied to a tunnel type cooler. This arrangement consists of an elongated tunnel 40 provided with doors 41 at one end through which the hot bread from the oven is introduced on wheeled trucks 42. The trucks run on suitable tracks and are advanced through the tunnel as additional trucks of freshly baked bread are introduced, and by the time the bread is completely cooled, the trucks are taken out of the tunnel at the opposite end through the doors 43. The length of the tunnel will depend upon the capacity of the bakery and the amount of time required to cool the bread. In the arrangement illustrated, the tunnel is long enough to accommodate five trucks of bread on each line and will accommodate three lines of trucks.

As the bread passes through the tunnel, it is subjected to different air conditions in the two halves of the tunnel, and for convenience the first half of the tunnel will be designated zone A, while the second half, or delivery end of the tunnel will be designated zone B. In the drawings, these two zones are shown to be approximately the same length, but this proportion is not critical and may be varied. It is desirable to maintain the two zones independent, and for this purpose a removable partition may be inserted between the two zones if desired, but under ordinary conditions such a partition is not necessary.

As the hot bread passes through zone A, hot gases and vapor rise from the bread to the top of the tunnel and are exhausted from this zone by exhaust fan 44 connected to the duct 45 arranged at the top of the tunnel and along one side of zone A, the air passing into duct 45 from zone A through ports 46 formed in the top wall of the tunnel. The fan 44 blows the exhaust gases into an exhaust duct 47 which discharges into the outside atmosphere. On the opposite side of zone A from duct 45 is arranged an inlet duct 48 provided with ports 49 formed in the top wall of the tunnel providing communication from the duct 48 to zone A. The inlet port of duct 48 is preferably covered by a filter element 50 to filter the air entering the zone A, although this filter may be omitted, if desired.

Near the center of the tunnel and at the front end of zone B is arranged an air supply duct 51 which communicates with zone B by means of ports 52 formed in the top wall of the tunnel. At the delivery end of zone B is arranged an air outlet duct 53 which withdraws air from the tunnel through the ports 54 formed in the top wall thereof. The air withdrawn from zone B is passed through air conditioning apparatus and is recirculated through zone B. In passing from the exhaust duct 54 back to the supply duct 51, the air from zone B passes through the air conditioning apparatus which consists of a filter element 55, the cooling coil 56, steam jet 57, and eliminators or baffles 58. The air is driven by means of a blower 59 which in turn is driven by motor 60. A humidostat 61 having a sensitive element formed of an organic material is located in the outlet duct 54 and is provided with suitable electric circuits for controlling a valve 62 in the supply line to a cooling coil 56 and for controlling a valve 63 located in the supply line for steam jet 57. The arrangement is such that in case the humidity of the air stream withdrawn from zone B becomes higher than a predetermined amount, humidostat 61 operates to open valve 62 and close valve 63, thereby admitting refrigerant to the cooling coil 56. This refrigerant maintains a proper dew point in the stream necessary to de-hydrate the air. If the air withdrawn through duct 54 becomes too dry, humidostat 61 operates to open valve 63 and close valve 62, thereby introducing moisture into the air stream by means of steam issuing from jet 57. If desired, a spray of water may be used instead of steam. Any entrained moisture in the air stream, either from the steam jet or from the cooling coils, is trapped by the eliminators 58, so the air which enters the blower 59 contains no entrained moisture.

In the operation of the cooler shown in Figures 5 to 7, the exhaust fan 44 withdraws the hot gases which rise to the top of zone A, and untreated air is admitted at the opposite side of the zone to facilitate the removal of hot gases. The air entering the zone from duct 48 passes over the top of the bread and removes the hot gases which rise from the hot bread. No attempt is made to draw air over the bottom of the bread, since the heat in these loaves is dissipated by convection and hot gases from the bread in the lower shelves rises to the top of the tunnel. As the bread on the racks leave zone A and enter zone B, it will be cooled to a temperature of approximately 110° F. As in the overhead conveyor type of cooler, I have found that the best conditions for cooling are obtained by maintaining the air in zone B in a condition such that as it leaves exhaust duct 54, it is maintained at a temperature of approximately 80° F.

and 50% relative humidity, although the temperature may vary without materially altering the result. By maintaining a sufficiently high static pressure in the supply duct 51, the velocity of the air leaving ports 52 is such that conditioned air will be forced to the floor as well as to the intermediate points in zone B.

It will be noted that the air withdrawn from zone B is wholly recirculated, and, in order that the two zones may be operated independently of each other, the amount of cooling air supplied to zone B through duct 51 should be substantially equal to the amount of cooling air withdrawn from zone B through duct 54. By completely recirculating the air in zone B the load on the refrigerating system will be reduced, since the only refrigeration that will be required is that necessary to cool the bread from approximately 110° F. to approximately 90° F. If the air were to be exhausted from zone B instead of recirculated, a greater load would be placed upon the refrigerating equipment since the air would require dehydrating.

While I prefer the arrangement illustrated in the drawings in which the air in zone B flows concurrent to the direction of travel of the bread through the tunnel, it will be understood that if desired, the conditioned air may flow counter to the direction of travel of the bread. Also, if desired, the inlet and outlet ducts for zone A could be arranged so that the air flowing across the top of this zone flows either in the same direction with the bread or counter to the direction of travel of the bread.

It should be noted that according to my invention, the cooling air is conditioned only as to humidity, and no direct control of the temperature of the cooling air is involved. This results in a considerable economy in operation of the cooler, since to attempt to regulate the absolute temperature and humidity of the cooling air would be very expensive. I have discovered that satisfactory results can be obtained by controlling simply the relative humidity, and since the material being cooled is an organic material, I prefer to employ a humidostat having a moisture sensitive element formed of organic material.

The filters 12, 23, 50 and 55 not only serve to remove dirt or other foreign matter from the air supplied to the cooler, but these filters are also formed of a material which will effectively filter out mold spores or bacteria, whereby the cooled bread is substantially free from mold contamination.

What I claim is:

1. A bread cooler comprising a housing, means for passing bread through said housing, means for introducing cooling air into said housing, means for withdrawing air from said housing near the exit end thereof, and for returning the air to said housing, means for varying the moisture content of the withdrawn air, and means responsive to the condition of the air leaving said housing for controlling said moisture varying means to maintain substantially constant humidity of the air leaving said housing.

2. A bread cooler comprising a housing forming an elongated passage, means for conducting bread through said passage, means for withdrawing heated air from the top of said passage at spaced points in a zone adjacent the entry end thereof, means for admitting unconditioned air at spaced points along the top of said passage on the opposite side of said zone, means for introducing cooling air into said passage adjacent the delivery end thereof, means for withdrawing said cooling air from said passage and recirculating the same through a zone adjacent the delivery end of said passage, means for controlling the humidity of the air withdrawn from said passage, and humidity responsive means for controlling the operation of said humidity control means for maintaining a substantial constant humidity of the cooling air withdrawn from said passage.

3. A bread cooler comprising an elongated tunnel, means for conveying bread through said tunnel, means for withdrawing hot gases from the top of said tunnel in a zone adjacent the entrance end thereof, means for admitting untreated air to said tunnel on the opposite side of said zone, means for introducing cooling air substantially at the middle of said tunnel, an exhaust duct for withdrawing cooling air from said tunnel at the delivery end thereof, means for recirculating said cooling air through the delivery zone of said tunnel and including air conditioning apparatus for maintaining a substantial constant humidity of the cooling air leaving the delivery end of said tunnel.

4. A bread cooler comprising an over-head traveling conveyor, a housing enclosing said conveyor, a partition arranged in said housing for dividing said housing into two substantially independent compartments, means on one side of the first compartment in which the hot bread first enters for exhausting hot gases therefrom, means on the opposite side of the first compartment for admitting untreated air to replace the hot gases, means for admitting cooling air to the second compartment, means for withdrawing cooling air from the second compartment at the exit end thereof, means for returning said withdrawn air to said second compartment and including air-conditioning means for maintaining said withdrawn air at a substantially constant humidity.

5. A cooler for bakery products comprising, an elongated passage, means for passing said products through said elongated passage, means for withdrawing hot vapors and air at spaced points on one side of said passage adjacent the entrance end of the passage, means for admitting untreated air at spaced points on the opposite side of said passage adjacent the entrance end thereof, means for circulating a stream of air over the bread in said passage adjacent the delivery end thereof, and means for regulating the moisture content of said stream of air.

6. A cooler for bakery products comprising, an elongated passage, means for passing the products through said elongated passage, means for withdrawing hot vapors and air at spaced points on one side of said passage adjacent the entrance end of the passage, means for admitting untreated air at spaced points on the opposite side of said passage adjacent the entrance end thereof, means for circulating a stream of air over said products in said passage adjacent the delivery end thereof, and means for regulating the moisture content of said stream of air to maintain a substantially constant humidity of air leaving said passage.

DWIGHT TENNEY.